US012781934B2

(12) United States Patent
Bertken

(10) Patent No.: US 12,781,934 B2
(45) **Date of Patent: *Nov. 3, 2026**

(54) BROAD VIEW HEADLAMP

(71) Applicant: Infinity X1 LLC, Carlsbad, CA (US)

(72) Inventor: Dennis Bertken, Carlsbad, CA (US)

(73) Assignee: Infinity X1 LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/388,220

(22) Filed: Nov. 13, 2025

(65) Prior Publication Data

US 2026/0243401 A1 Aug. 20, 2026

Related U.S. Application Data

(63) Continuation of application No. 19/007,443, filed on Dec. 31, 2024, now Pat. No. 12,595,888, which is a (Continued)

(51) Int. Cl.
*F21S 41/25* (2018.01)
*F21S 41/143* (2018.01)
(Continued)

(52) U.S. Cl.
CPC ............ *F21S 41/25* (2018.01); *F21S 41/143* (2018.01); *F21V 14/02* (2013.01); *F21Y 2113/00* (2013.01); *F21Y 2115/10* (2016.08)

(58) Field of Classification Search
CPC ......... F21S 41/25; F21S 41/143; F21V 14/02; F21V 23/0464; F21V 23/0492;
(Continued)

(56) References Cited

U.S. PATENT DOCUMENTS 1,034,492 A 8/1912 Nielsen
5,408,393 A 4/1995 Becker
(Continued)

FOREIGN PATENT DOCUMENTS

CN 101725884 A 6/2010
CN 202118535 U 1/2012
(Continued)

OTHER PUBLICATIONS 350 lumen wide beam flashlight, ToolSource Product Listing, Dorcy Model No. 289480, product added to catalog Apr. 27, 2019, retrieved from Internet <https://www.toolsource.com/flashlights-c-370_385_632/350-lumen-wide-beam-flashlight-p-289480.html>.

(Continued)

*Primary Examiner* — Elmito Breval
(74) *Attorney, Agent, or Firm* — Wang Hardoon, P.C.

(57) ABSTRACT

The broad view headlamp includes a plurality of light sources that illuminate an area in front of the headlamp, an area adjacent to each side of the headlamp, and an area below the headlamp. The headlamp includes a number of lighting modes, such that any one of the light sources can be operated individually or in combination with any one or more of the remaining light sources. The headlamp housing has multiple lighting compartments, each having one or more light sources disposed therein. Each compartment includes an optical lens. The various light sources, together with the optical lenses, allow the headlamp to illuminate a view area extending to, at least, the outer boundaries of the far peripheral vision of the human eye, i.e., 110 degrees to the right and left of center. Thus, the total combined view area illuminated by the headlamp is at least 220 degrees.

23 Claims, 5 Drawing Sheets

Related U.S. Application Data continuation of application No. 18/503,121, filed on Nov. 6, 2023, now Pat. No. 12,203,618, which is a continuation of application No. 17/804,749, filed on May 31, 2022, now Pat. No. 11,852,311, which is a continuation of application No. 17/315,292, filed on May 8, 2021, now Pat. No. 11,384,913.

(60) Provisional application No. 63/022,487, filed on May 9, 2020.

(51) Int. Cl.

*F21V 14/02* (2006.01)
*F21Y 113/00* (2016.01)
*F21Y 115/10* (2016.01)

(58) Field of Classification Search

CPC ............... F21V 21/084; F21V 23/0414; F21Y 2115/10; F21Y 2113/00; F21Y 2107/00; F21L 4/02

See application file for complete search history.

(56) References Cited

U.S. PATENT DOCUMENTS

| | | | |
|---|---|---|---|
| 6,481,869 | B1 | 11/2002 | Horandel et al. |
| 6,955,444 | B2 | 10/2005 | Gupta |
| 7,121,676 | B1 | 10/2006 | Kutnyak |
| 7,192,165 | B2 | 3/2007 | Petzl et al. |
| 7,226,190 | B2 | 6/2007 | Petzl et al. |
| 8,378,587 | B2 | 2/2013 | Huguenin et al. |
| D711,028 | S | 8/2014 | Pritchett |
| 9,458,985 | B2 | 10/2016 | Pritchett |
| 9,534,750 | B2 | 1/2017 | Pritchett |
| 10,794,549 | B2 | 10/2020 | Pritchett |
| 10,794,550 | B2 | 10/2020 | Pritchett |
| 2006/0087842 | A1 | 4/2006 | Alessio |
| 2009/0251070 | A1 | 10/2009 | Petzl et al. |
| 2010/0181940 | A1 | 7/2010 | Bucalo |
| 2013/0308308 | A1 | 11/2013 | Pritchett |
| 2014/0085872 | A1 | 3/2014 | Taylor |
| 2014/0146552 | A1 | 5/2014 | Hui |
| 2014/0198484 | A1 | 7/2014 | Feustel et al. |
| 2014/0334132 | A1 | 11/2014 | Ferguson |
| 2019/0083739 | A1 | 3/2019 | Jeannin |
| 2019/0150249 | A1 | 5/2019 | Bertken et al. |
| 2019/0213716 | A1 | 7/2019 | Oniki |
| 2020/0003371 | A1 | 1/2020 | Ganahl |
| 2020/0248896 | A1 | 8/2020 | Gall et al. |

FOREIGN PATENT DOCUMENTS

| | | | |
|---|---|---|---|
| CN | 103629541 | A | 3/2014 |
| CN | 107990267 | A | 5/2018 |
| EP | 2827684 | B1 | 1/2015 |
| GB | 2499433 | A | 8/2013 |
| JP | 2010262922 | A | 11/2010 |
| JP | 2018092922 | A | 6/2018 |
| KR | 101981248 | B1 | 5/2019 |
| WO | 2006080918 | A1 | 8/2006 |
| WO | 2009088295 | A1 | 7/2009 |
| WO | 2019213716 | A1 | 11/2019 |
| WO | 2021097348 | A1 | 5/2021 |

OTHER PUBLICATIONS

3pk Defiant 50 Lumen LED Headlamp Flashlights, 9 AAA Baterries Included, Amazon Listing, Nov. 24, 2016, retrieved from Internet: <https://www.amazon.com/gp/product/B01N45RJR2/>.

Black Diamond Cosmo Headlamp—Youtube, posted Nov. 1, 2017 by user "Enwild", Retrieved from Internet: <https://www.youtube.com/watch?v=5epLYuMH-mo>.

Black Diamond Icon Headlamp—Youtube, posted Jun. 7, 2015 by user "Enwild", Retrieved from Internet: <https://www.youtube.com/watch?v=py6TKwdUops>.

Black Diamond Icon Polar Review, Gear Institute, Nov. 25, 2015, retrieved from Internet: <https://gearinstitute.com/gear-review/black-diamond-icon-polar/>.

Black Diamond Spot 300 Lumens Headlamp Unbox & Review!—Youtube, posted Dec 16, 2017 by user "CatholicHack's Traditional Archery", Retrieved from Internet: <https://www.youtube.com/watch?v=Jz_AamrGk8M>.

Black Diamond, Black Diamond ReVolt 350 Headlamp, REI Website (Link: https:/www.rei.com/product/170741/black-diamond-revolt-350-headlamp?color=AZUL), US.

Bright Star LED Headlamp—Intrinsically Safe, Hands-Free, IPX4 Water-Resistant, Multiple Modes, 120+ Hour Runtime, Emergency Headlight with Batteries Included—Durable & Long-Lasting Safety Light, Amazon Listing, Nov. 6, 2017, retrieved from Internet: <https://www.amazon.com/BrightStar-LED-Headlamp-Intrinsically-Water-Resistant/dp/B0776MN73W/>.

Coast FL75 405 Lumen Focusing Headlamp Review—Youtube, posted Sep. 23, 2016 by user "TrailAndMountain", Retrieved from Internet: <https://www.youtube.com/watch?v=_YjC-S_iQMM>.

Coast, Coast FL60R 450 Lumen Rechargeable LED Flashlight, Accessories Included, orange, Amazon Marketplace (Link: https://www.amazon.com/COAST-Rechargeable-Flashlight-Accessories-Included/dp/B07YFBRWW6/ref=pd_lpo_2?pd_rd_i=B07YFBRWW6&psc=1), US.

Coast, Coast FL78R 530 Lumen Rechargeable Tri-Color LED Headlamp with Twist Focus (https://www.amazon.com/COAST-FL78R-Rechargeable-Tri-Color-Headlamp/dp/B07W62W1M1), US.

Coast, Coast FL85R 700 Lumen Dual Color (White/Red) Focusing Rechargeable LED Headlamp, Rechargeable Battery Included (Amazon Marketplace (Link: https://www.amazon.com/Coast-Rechargeable-Focusing-Headlamp-Lumens/dp/B07NF65MGC), US.

Dorcy International inc, Product Catalog Life+Gear, Last Updated: May 2019.

Energizer Hard Case Magnetic Head Light—Youtube, posted Feb. 14, 2017 by user "That Daily Deal", Retrieved from Internet: <https://www.youtube.com/watch?v=3icstgHLGn4>.

Energizer, Energizer Rechargeable LED Headlamp, Water Resistant & Super Bright, Rugged Headlight for Camping, Running, Outdoors, Emergency Light, (USB Included), Amazon Marketplace (Link: https://www.amazon.com/Energizer-Vision-Ultra-Rechargeable-Resistant-Headlight-Emergency/dp/B07JD4KNKQ).

FL75 (product page), CoastPortland.com, retrieved from Internet: <https://www.coastportland.com/products/fl75>.

How To: Use Your Revolt Headlamp—Youtube, posted Nov. 19, 2017 by user "Black Diamond Equipment", Retrieved from Internet: <https://www.youtube.com/watch?v=l6cYbXGwico>.

Illumagear: "Halo SL Product Demonstration," Apr. 17, 2020, XP093052948, Retrieved from https://www.youtube.com/watch?v=KhyUiD60Um4.

International Search Report and Written Opinion issued in PCT/US2021/031450, dated Aug. 16, 2021, 11 pages.

Irishtitan Dev, Dorcy Wide Beam LED 850 Lumen Flashlight, Sep. 11, 2016, retrieved from Internet: <https://www.dorcy.com/news/dorcy-wide-beam-led-850-lumen-flashlight/>.

Jediah Porter, Black Diamond Cosmo Review, GearLab, May 28, 2018, retrieved from Internet <https://www.outdoorgearlab.com/reviews/camping-and-hiking/headlamp/black-diamond-cosmo>.

Lepro LE Headlamp Rechargeable, LED Head Lamp with 6 Modes for Camping & Hiking Gear Essentials, IPX4 Waterproof High Lumen Bright Headlight Flashlights with Adjustable Headband, USB Cable Include, Amazon Listing, Sep. 18, 2019, retrieved from Internet: <https://www.amazon.com/Rechargeable-Essentials-Waterproof-Flashlights-Adjustable/dp/B07Y21GMKQ/>.

Meeko-Lite Product Catalog, Ningbo Meeko Liesure Products Co., LTD, Value-Lite.com.

Nightstick NSP-4614B Low-Profile Dual-Light™ Headlamp—Youtube, posted Mar. 27, 2018 by user Nightstick, retrieved from Internet: <https://www.youtube.com/watch?v=NyYgc-yDvHg>.

(56) References Cited

OTHER PUBLICATIONS

Olight HS2 Battery Bank Powered Headlamp!!—Youtube, posted Sep. 15, 2017 by user "Living Survival," Retrieved from Internet: <https://www.youtube.com/watch?v=9387kva8ngA>.

Optimal Ventures LLC, Liteband ACTIV 400 Wide-Beam LED Headlamp—210° Illumination, 400 Lumens, Lightweight, Weatherproof, Rechargeable, USB-C, Red LED Mode—Camping, Running, Hiking, Fits Hard Hats, LBA400-L18N, Night, Amazon Marketplace (Link: https://www.amazon.com/Liteband-ACTIV-400-Wide-Beam-Headlamp/dp/B08C2BD737/ref=sr_1_2?keywords=LBA400+L18N&qid=1637104556&sr=8-2).

Optimal Ventures LLC, OV LED 802100 Broadbeam LED Headlamp, Ultra-Low Profile Durable Elastic Headband, 210° Illumination, 300 Lumens, 20 Bright LED Lights, 3 AAA Battery Powered, 3 Power Settings, Amazon Marketplace (Link: https://amazon.com/802100-Broadbeam-Headlamp-Ultra-Low-Illumination/dp/B07GT49F9C/ref=sr_1_19?dchild=1&keywords=headlamp+strap&qid=1608149644&sr=8-19). US.

Petzl PIXA 3 Headlamp Review—Youtube, posted Apr. 27, 2012 by user "Tool-Rank", Retrieved from Internet: <https://www.youtube.com/watch?v=z5VuB501W0U&t)>.

Petzl, Petzl Actik Core Headlamp, REI Website (Link: https:/www.rei.com/product/163701/petzl-actik-coreheadlamp?color=RED), US4.

Petzl, Petzl Tactikka Core Headlamp, REI Website (Link: https:/www.rei.com/product/163703/petzl-tactikka-coreheadlamp), US.

Petzl, Pixa 3R Accu Pro Headlamp, Amazon Listing, May 14, 2012, retrieved from Internet: <https://www.amazon.com/Petzl-E78CHR-PIXA-Rechargeable-Headlamp/dp/B0083CNW9I>.

Princeton Tec Apex Extreme LED Headlamp, Amazon Listing, Sep. 12, 2013, retrieved from Internet: <https://www.amazon.com/Princeton-Tec-Apex-Extreme-Headlamp-Lumens/dp/B00F5EASZ8/>.

Princeton Tec Apex Headlamp—Youtube, posted Nov. 14, 2009 by user "Gear Websites", Retrieved from Internet: <https://www.youtube.com/watch?v=inNia_1tN2A>.

Product Catalog, Ningbo Sunlight Electronics Co., Ltd., https://nb-sunlight.net/catalogue.asp.

Railhead Gear LED Lightweight Headlamp, Battery Powered Industrial 200 Lumen Light with Strap for Adults with 3 Modes, KE-HL100, Amazon Listing, Aug. 4, 2017, retrieved from Internet: <https://www.amazon.com/Railhead-Gear-Distance-Flash-Red-KE-HL100/dp/B074JJ742W/>.

RJ Spurrier, Black Diamon Spot Review, GearLab, May 28, 2018, retrieved from Internet <https://www.outdoorgearlab.com/reviews/camping-and-hiking/headlamp/black-diamond-spot>.

RJ Spurrier, Black Diamond ReVolt Review, GearLab, May 28, 2018, retrieved from Internet <https://www.outdoorgearlab.com/reviews/camping-and-hiking/headlamp/black-diamond-revolt>.

RJ Spurrier, The Hunt for the Best Headlamps, GearLab, last updated May 29, 2018, retrieved from Internet <https://www.outdoorgearlab.com/topics/camping-and-hiking/best-headlamp>.

Screen captures from Facebook video clip entitled "MORF Removables R230 :30 TV Commercial," 2 pages, posted May 6, 2020 by user "Police Security Flashlights". Retrieved from Internet: < https://www.facebook.com/psbrandsflashlights/videos/morf-removables-r230-30-tvcommercial/226232995334623/>.

Streamlight 61420 Enduro Pro 200-Lumen 2250-Candela Ultra-Light LED Headlamp with AA Batteries and Elastic Strap, Box, Yellow, Amazon Listing, Dec 15, 2017, retrieved from Internet: <https://www.amazon.com/Streamlight-61421-Alkaline-Batteries-Headstrap/dp/B078BHZQHF/>.

Streamlight Enduro Pro at SHOT Show 2018—Youtube, posted Jan. 26, 2018 by user "TacticalGear.com", Retrieved from Internet: <https://www.youtube.com/watch?v=Ju_eemV4_11)>.

The Awesome Olight H16 Wave Motion Activated LED Headlamp Review—Youtube, posted Mar. 9, 2018 by user "Peter von Panda", Retrieved from Internet: <https://www.youtube.com/watch?v=efM6EUTbD68&t>.

BROAD VIEW HEADLAMP

PRIORITY

This application is a continuation of and claims the benefit of priority to U.S. patent application Ser. No. 19/007,443 entitled "BROAD VIEW HEADLAMP" filed Nov. 6, 2023, which is a continuation of and claims the benefit to priority to patent application Ser. No. 18/503,121 entitled "BROAD VIEW HEADLAMP" filed Nov. 6, 2023, which is a continuation of and claims the benefit to priority to U.S. patent application Ser. No. 17/804,749 entitled "BROAD VIEW HEADLAMP" filed May 31, 2022, which is a continuation of and claims the benefit to priority to U.S. patent application Ser. No. 17/315,292 entitled "BROAD VIEW HEADLAMP" filed May 8, 2021, which claims the benefit of priority to U.S. Provisional Patent Application No. 63/022,487 filed on May 9, 2020, entitled "BROAD VIEW HEADLAMP", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention relates to headlamps with multiple lighting capabilities. More specifically, this invention relates to multi-mode headlamps that provide multiple lighting modes for illuminating different areas of interest.

DESCRIPTION OF RELATED TECHNOLOGY

Headlamps mount to the head of a user to provide hands-free lighting. Traditional headlamps typically include a spot beam and/or a flood beam to illuminate an area in front of the user. As an example, U.S. Pat. No. 7,226,190 to Petzl discloses a portable lighting lamp comprising an emitting module equipped with at least one light-emitting diode for emitting a light beam, a fixing and connecting element of said diode, and an optical focusing device able to be moved in front of the diode to make the visualization angle of the light beam vary. The optical focusing device is advantageously constituted by one or more Fresnel lenses mounted on a swiveling support or a rotary knob designed to occupy either an inactive position situated outside the light emission field of the diode or an active position wherein said tight beam passes through the lens so as to obtain either broad lighting with a short range or narrow lighting with a long range.

While useful, traditional headlamps do not provide peripheral or downward-disposed lighting, in addition to the forward-directed lighting. Thus, the user is required to move his/her head to re-direct the spot/flood beams to illuminate an area of interest. In an effort to address the peripheral lighting deficiency of traditional headlamps, wide-angle headlamps are designed to provide wide-angle lighting. Wide-angle headlamps include a number of LED lights positioned along a flexible strip or band to deliver wide-angle continuous lighting to provide front-on and peripheral lighting. While wide-angle headlamps are able to illuminate a broader area, they do not provide the capability to deactivate one or more of the lights to produce various lighting effects, such as front-on only or peripheral-only lighting. Further wide-angle headlamps do not utilize reflectors or lenses to provide directed, i.e., focused, lighting. Instead, the strip of LEDs simply casts a broad, non-focused spread of light. Additionally, as with traditional headlamps, wide-angle headlamps do not provide a capability for downward-directed lighting that can be used in addition to forward-directed lighting.

Based on the foregoing, there's a need in the art for a headlamp that provides any desired combination of forward-disposed lighting, far peripheral lighting, and/or downward-disposed lighting to improve the overall visibility capabilities of the user.

DETAILED DESCRIPTION

Figure 1:
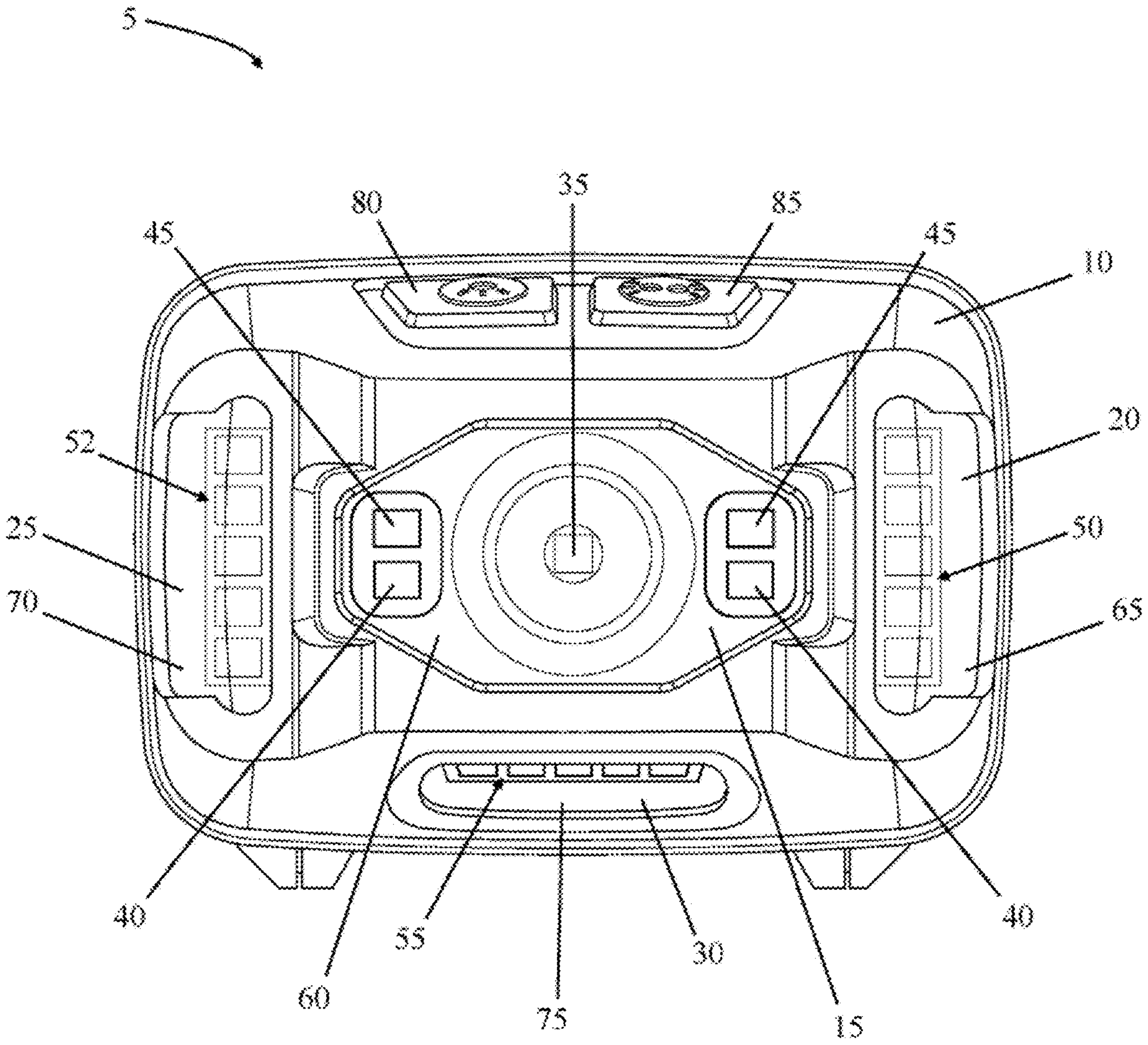
FIG. 1 shows a top-front perspective view of the broad view headlamp, according to an embodiment of the present invention.
Figure 2:
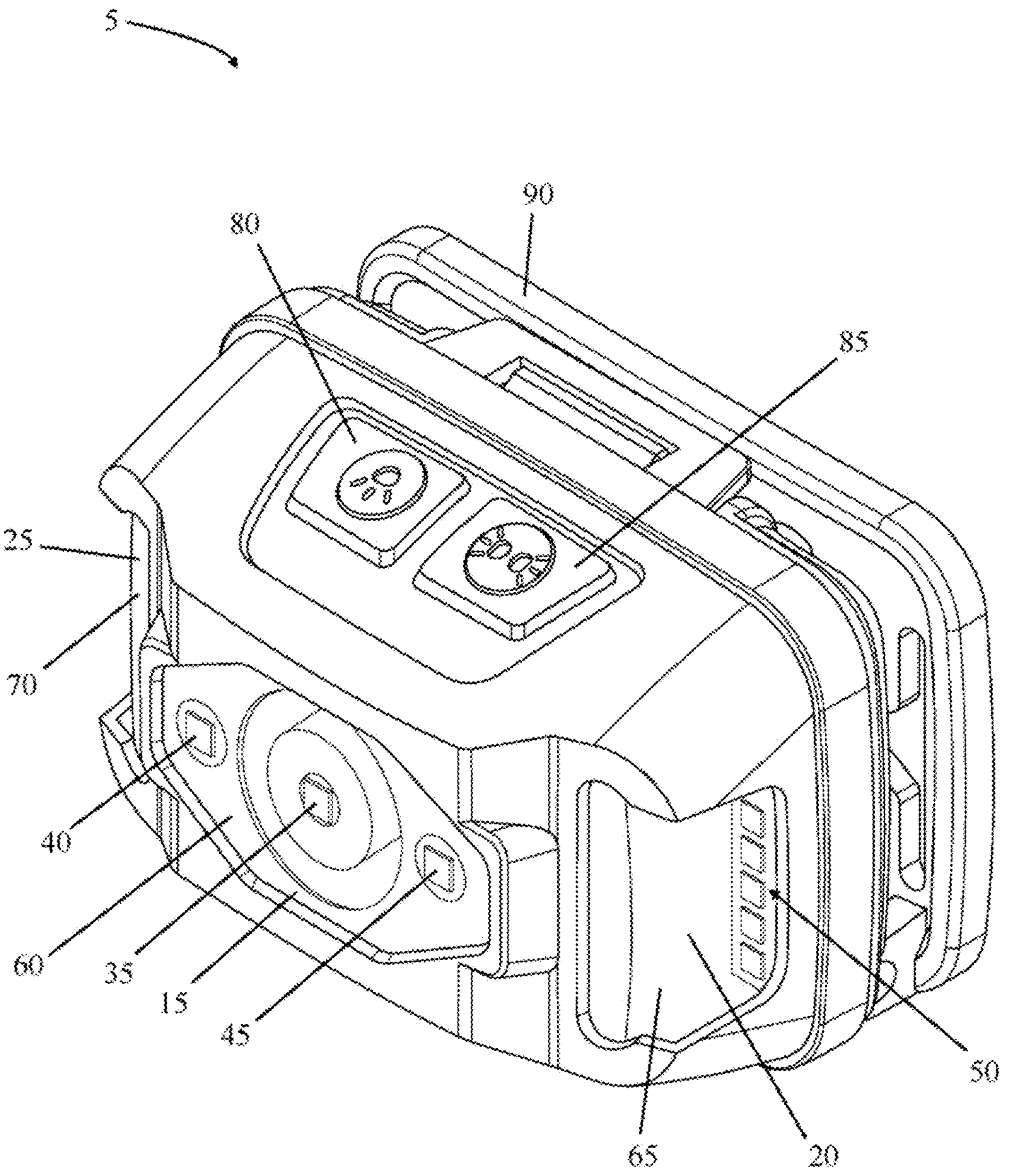
FIG. 2 shows a rear-bottom perspective view of the broad view headlamp, according to an embodiment of the present invention.
Figure 3:
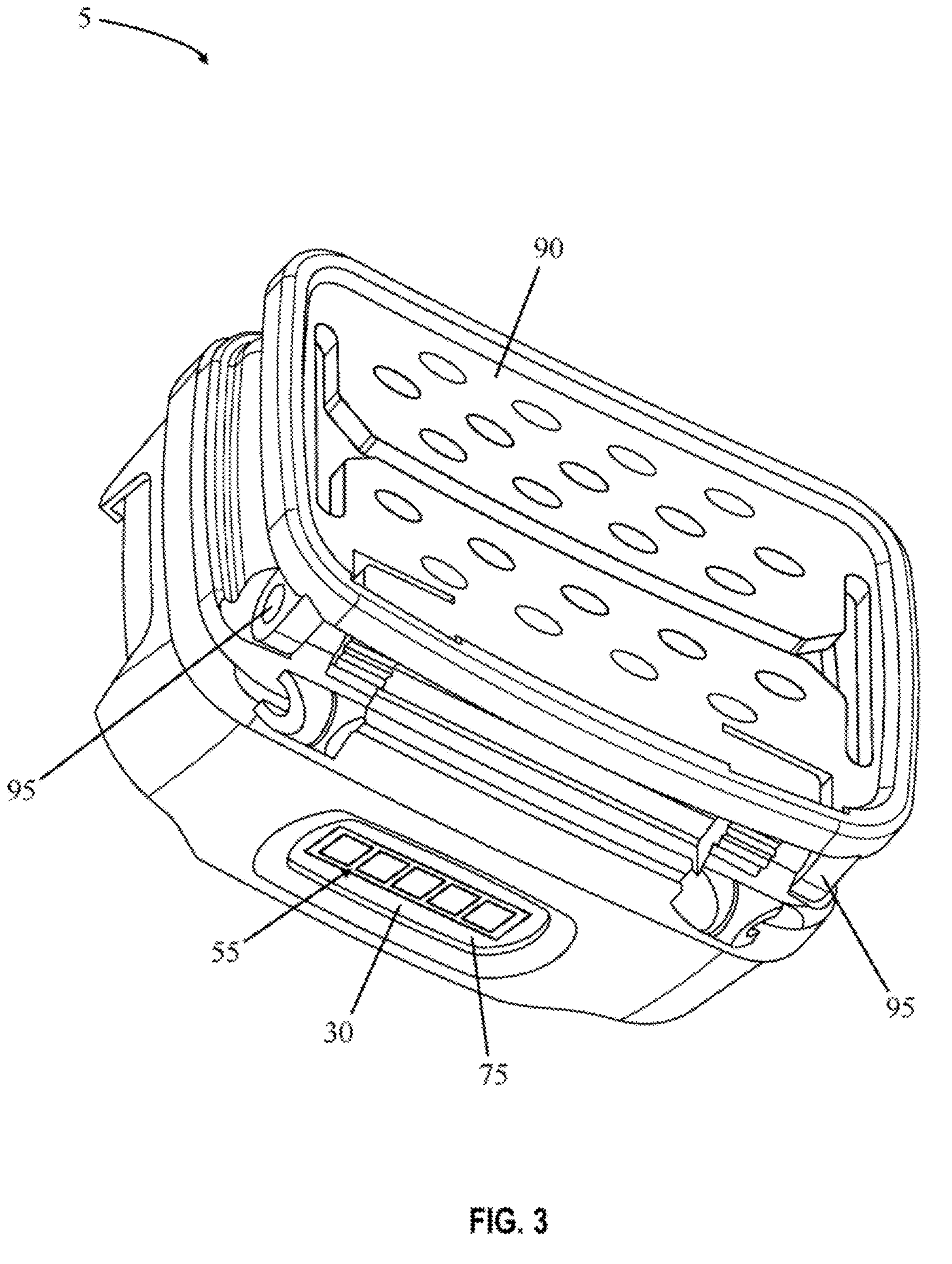
FIG. 3 shows a front elevational view of the broad view headlamp, according to an embodiment of the present invention.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Broad View Headlamp

With reference to FIGS. 1-5, headlamp 5 includes housing 10 having multiple lighting compartments 15, 20, 25, 30, each housing one or more light source 35, 40, 45, 50, 52, 55. Light sources 35, 40, 45, 50, 52, 55 are preferably comprised of one or more LEDs. In an embodiment, one or more of the lighting compartments 15, 20, 25, 30 contain, in addition to the LED(s), one or more reflectors to gather and direct light generated by the LED(s) to an area adjacent to, e.g., in front of, beside, behind, and/or below, headlamp 5. Additionally, each lighting compartment 15, 20, 25, 30 includes an optical lens 60, 65, 70, 75 configured to increase a degree of horizontal and vertical lighting and beam distance of light output by light sources 35, 40, 45, 50, 52, 55. The array of light sources 35, 40, 45, 50, 52, 55, together with the reflectors and optical lenses 60, 65, 70, 75, allows headlamp 5 to illuminate a view area extending to, at least, the outer boundaries of the far peripheral vision of the human eye, i.e., 110 degrees to the right and left of center. Thus, as opposed to traditional headlamps that typically illuminate a view area of approximately 30 degrees, the total view area illuminated by headlamp 5 is at least 220 degrees.

Housing 10 is designed to prevent infiltration of liquid into the interior of housing 10, including, but not limited to, the battery compartment (not shown) and lighting compartments 15, 20, 25, 30. Depending on the desired application, housing 10 may be designed with a certain degree of water-resistance, such that it can be exposed to water according to specified conditions, e.g., splashing, spraying, etc., without risk of water entering housing 10. Alternatively, housing 10 may be designed to be completely waterproof, such that housing 10 can be fully submerged in water to pre-defined depths without risk of water entering housing 10.

Light sources 35, 40, 45, 50, 52, 55 can be activated individually or in combination with one or more of the other light sources 35, 40, 45, 50, 52, 55, depending on the desired lighting effect. For example, light source 35 can be activated to provide focused beam, i.e., spot beam, lighting in front of headlamp 5; light source 40 can be activated to provide broad-beamed, i.e., flood beam, lighting in front of headlamp 5; light source 45 can be activated to provide night vision lighting, e.g., red or blue-green light, in front of headlamp 5; light sources 50, 52 can be activated to provide wide-angle, i.e., far peripheral, lighting to the sides/rear of headlamp 5; or light source 55 can be activated to provide downwardly-disposed lighting below headlamp 5. Additionally, light sources 35, 40, 45, 50, 52, 55 can be activated in any combination to provide unique lighting options, based on the user's specific environmental needs. For example, with headlamp 5 positioned at the front of the user's head, if the user only wants to illuminate areas in his/her periphery and at the ground surface, he/she can activate only light sources 50, 52, 55. As another example, if the user only wants to illuminate the area forward of the user and at the ground surface, he/she can activate one or both of light sources 35/40 in combination with light source 55. As yet another example, if the user only wants to illuminate the area forward of himself/herself and areas in his/her periphery, he/she can activate one or both of light sources 35/40 in combination with light sources 50, 52. These examples are for illustrative purposes only, and should not be construed as limiting the lighting capabilities of the present invention to any particular lighting combinations.

Multifunctional switches 80, 85 are used to power-on/off and operate headlamp 5. In a preferred embodiment, as shown in the figures, switches 80, 85 are push-button switches. Switches for operating electronic devices are known to those skilled in the art and can be embodied in a number of ways other than that as illustrated. As such, other types of switches (other than those shown) could be employed with the present invention without deviating from the scope of the invention.

Once powered on, switches 80, 85 may be used for various functions, including, for example, switching between lighting modes, locking/unlocking operation/functionality of switches 80, 85, dimming light sources 35, 40, 45, 50, 52, 55, and setting a power-off timer (e.g., 15 minutes, 30 minutes, 1 hour, 2 hours, etc.) for powering off headlamp 5. In an embodiment, the functions of switches 80, 85 are executed based on a pre-determined action sequence, e.g., a 3-second press/touch-and-hold of one or both of switches 80, 85, a single press/tap and release, or a fast double press/tap and release or hold of one of switches 80, 85. For example, switches 80, 85 may be configured to power-on/off headlamp, based on a 3-second press/touch-and-hold of one or both of switches 80, 85. Once powered on, a single press/touch and release of switch 80 may be configured to toggle or switch between lighting modes; whereas, a single press/touch and release of switch 85 may be configured to set a power-off timer. Likewise, a fast double press/tap and hold of switch 80 may be configured to lock/unlock operation of switches 80, 85; whereas, a fast double press/tap and hold of switch 85 may be configured to dim the currently-activated light sources 35, 40, 45, 50, 52, 55 (or return lights to full brightness if currently in a dimmed setting). The foregoing examples are provided for illustrative purposes only, and are not meant to limit the scope of the present invention in any way. Switches 80, 85 can be pre-configured in any way to accomplish the desired functions. Likewise, additional switches (not shown) may be added to execute the various functions of headlamp 5.

Light sources 35, 40, 45, 50, 52, 55 and switches 80, 85 are in electrical communication with a lighting control module (not shown) within headlamp 5. The lighting control module is configured to receive, interpret, and execute user commands input by way of switches 80, 85. Circuitry and other mechanisms for operating a device using switches are known to those skilled in the art and can be carried out in a number of ways. Any such circuitry or mechanism can be used with the present invention without deviating from the scope of the invention.

The lighting control module is in electrical communication with a battery (not shown). In some embodiments, headlamp 5 may be configured to receive power from only one battery type, e.g., single-use (i.e., dry cell) batteries or rechargeable batteries (e.g., lithium-ion batteries). Alternatively, headlamp 5 may be configured as a dual power, or hybrid power, device, whereby it is configured to receive power from multiple battery types, e.g., single-use (i.e., dry cell) batteries or rechargeable batteries (e.g., lithium-ion batteries). For embodiments that employ rechargeable batteries, a charging dock or other charging apparatus/technology (not shown) may be used for recharging the batteries.

Charging may be accomplished via any known technology known in the art, including, but not limited to, wired charging and/or inductive charging.

A heatsink assembly (not shown) may be required to keep the operating temperature of light sources 35, 40, 45, 50, 52, 55 at an acceptable operating temperature. Further disclosure of LED heatsinks is not considered necessary as they are known to those of skill in the art. Any known heat sinking method and/or configuration may be used with the present invention.

Panel 90 is coupled to the rear of headlamp 5 by hinges 95, allowing panel 90 to transition between an open and closed position. In the closed position, the edge of panel 90 opposite hinges 95 releasably engages the rear of headlamp using, for example, a releasable fastener as shown in the figure to secure panel 90 in the closed position. When released, panel 90 pivots open to, among other things, provide access to the battery compartment (not shown) and/or facilitate coupling or decoupling of headband 100 to/from headlamp 5, as shown in FIGS. 4-5.

Figure 4:
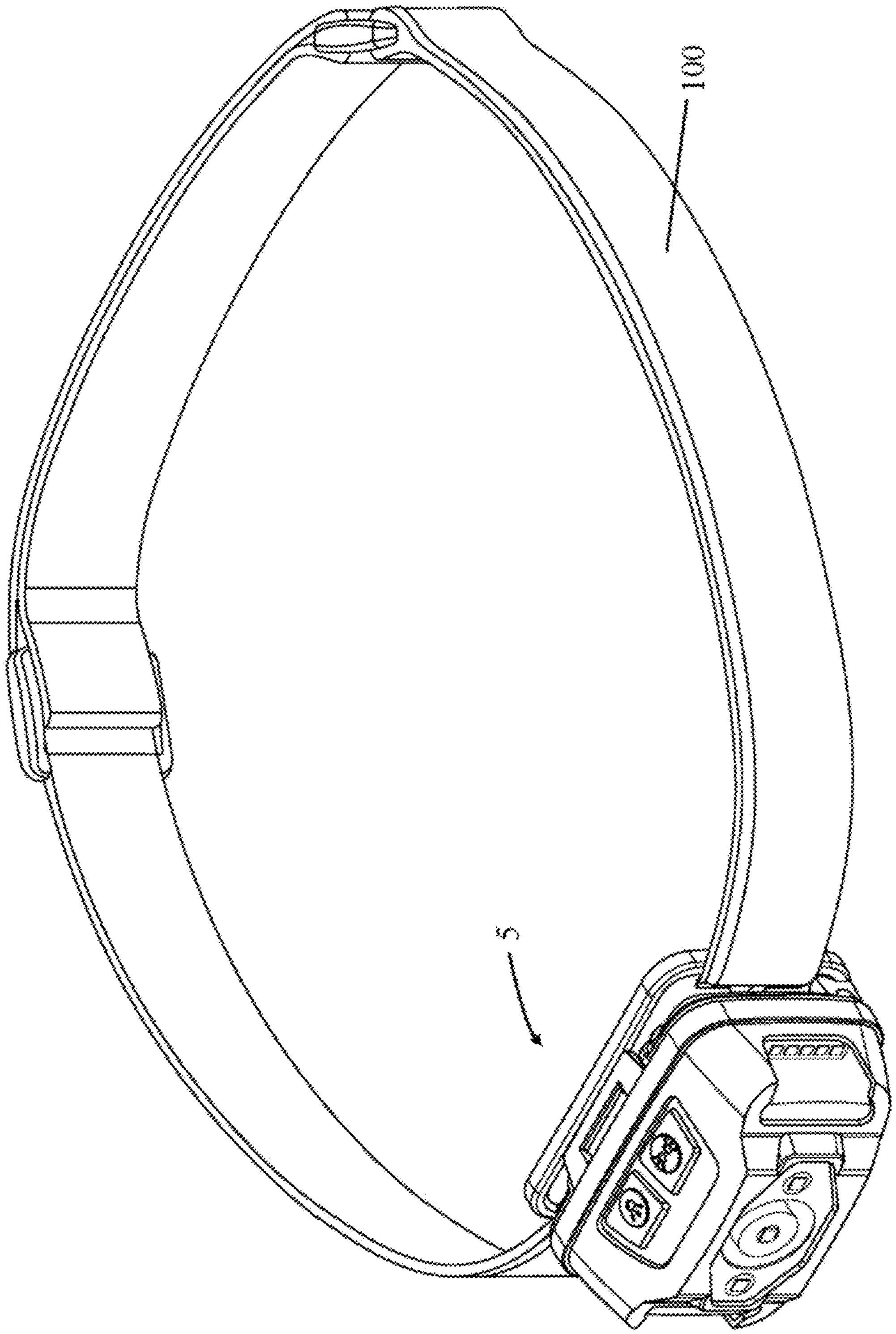
FIG. 4 shows a top-front perspective view of the broad view headlamp with a head strap attached, according to an embodiment of the present invention.
Figure 5:
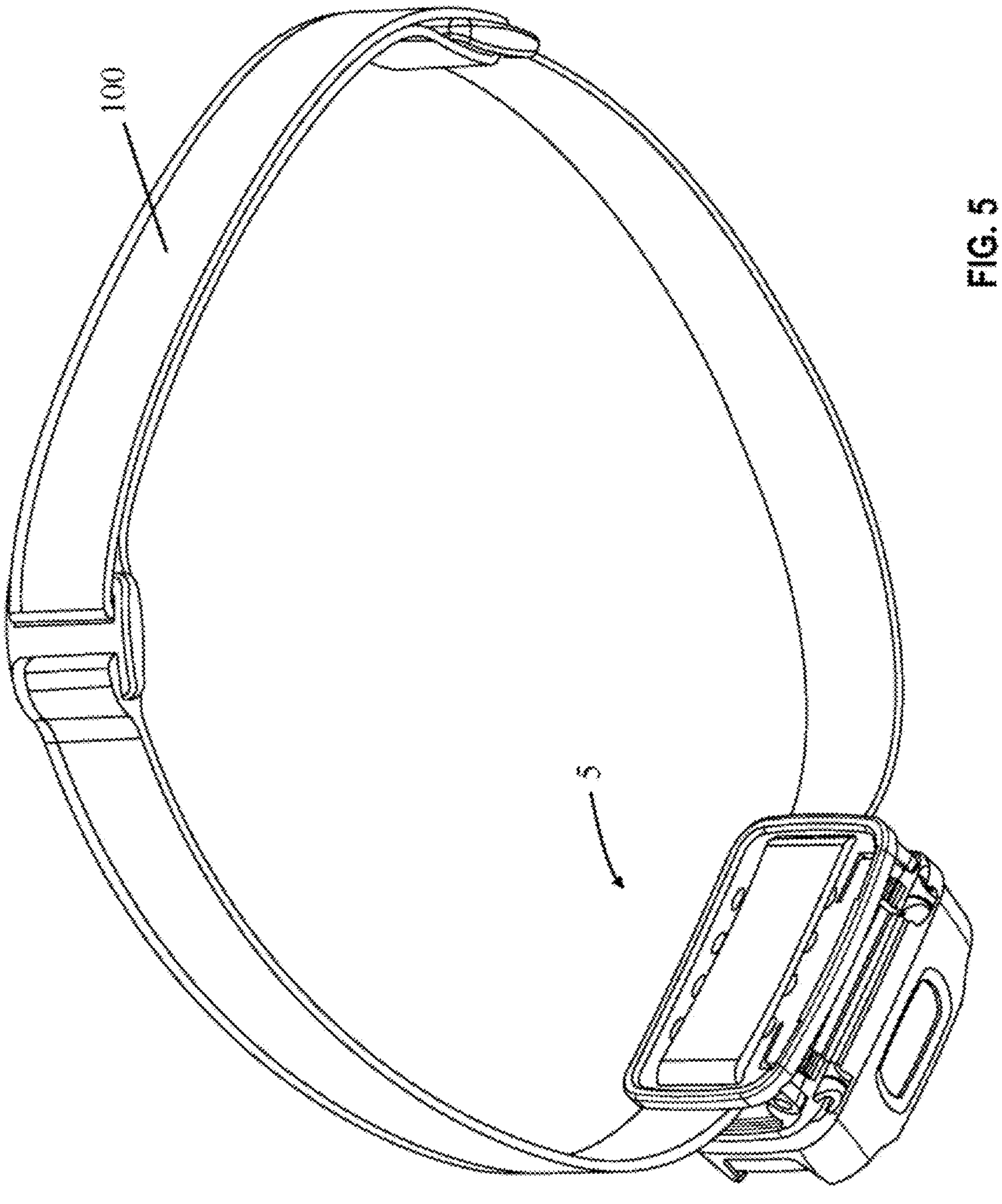
FIG. 5 shows a rear-bottom perspective view of the broad view headlamp with a head strap attached, according to an embodiment of the present invention.

In a preferred embodiment, as shown in FIGS. 4-5, headlamp 5 includes headband 100 for securing headlamp 5 to the user's head. Headband 100 is adjustable and is configured to encircle the head of a user (not shown), thereby supporting headlamp 5 on the user's head. The size of headband 100 may be secured at a desired diameter to fit the head of the user by a locking mechanism. A variety of securing mechanisms that will secure headband 100 at a desired size are well known to those of skill in the art. Therefore, the invention is not limited to any particular securing mechanism. In an embodiment, headband 100 has an adjustable, over-the-head support band (not shown). Just as with the securing mechanism for headband 100; securing mechanisms used to hold the over-the-head support are well known to those of skill in the art. Therefore, the invention is not limited to any particular securing mechanism. In lieu of using headband 100, headlamp may be secured to an object (not shown), e.g., eyewear (glasses, goggles, etc.), hats, etc. using a variety of securing mechanisms known to those of skill in the art. Therefore, headlamp 5 should not be construed as being limited to use with headband 100.

In various embodiments, headlamp 5 includes one or more sensors (not shown). Example sensors include, but are not limited to, an ambient light sensor, an inertial sensor (e.g., an accelerometer and/or a gyroscopic sensor), a motion sensor (e.g., a PAIR sensor, a microwave sensor, etc.), a heat sensor, a voltage detection sensor, a distance sensor, or any other sensor that can be used to detect changes in conditions of or external to headlamp 5. The sensors are in electrical communication with the control module, which is configured to receive real-time data from the sensor(s) and intuitively initiate/adjust lighting conditions/operations of headlamp 5 in real-time. For example, based on data received from the sensor(s), the control module may be configured to adjust the intensity/output of one or more light sources 35, 40, 45, 50, 52, 55, initiate or adjust lighting modes, initiate a low-power standby mode, "wake" headlamp 5 from the standby/sleep mode, etc.

In various embodiments, the control module is configured to initiate and/or adjust lighting settings of headlamp 5, based on data received from the sensors and pre-programmed logic stored in memory of the control module. For example, in an embodiment, the control module is configured to compare the data received from the sensor(s) to one or more threshold values stored in the memory, wherein the control module is configured to adjust the lighting device output modes and intensity of one or more light sources 35, 40, 45, 50, 52, 55 only when the threshold value(s) are met or exceeded. Additionally, the sensor(s) may be pre-programmed with one or more threshold values for detecting motion, wherein the sensor(s) are configured to transmit data to the control module only when the threshold value(s) are met or exceeded.

An ambient light sensor may be used to detect and measure light intensity external to the multipurpose lighting device. In an embodiment, the control module includes program logic configured to select and adjust lighting output modes and initiate and adjust an intensity of one or more light sources 35, 40, 45, 50, 52, 55 using pulse width modulation brightness controls responsive to the ambient light sensor data.

An inertial sensor and/or a motion sensor may be used to detect motion of or external to headlamp 5. In an embodiment, if motion of or external to headlamp 5 is not detected for a pre-configured amount of time, the control module is configured to initiate a standby mode. Upon initiation of the standby mode, the control module may be configured to save current state settings and disable all peripherals except one or more sensors, e.g., the inertial sensor, the motion sensor, and/or the ambient light sensor. If, during the standby mode, motion is detected for a pre-configured amount of time, the control module is configured to initiate an operating mode. In an embodiment, the operating mode is a lighting mode in use immediately preceding initiation of the standby mode. In an embodiment, the control module is configured to disrupt the standby mode if the control module detects a low battery condition during the standby mode. In a further embodiment, if the standby mode is disrupted due to detection of the low battery condition, the control module is configured to initiate a dim lock mode upon disruption of the standby mode.

In an embodiment, the control module is able to modify lighting output (e.g., initiate a lighting mode, change lighting mode, alter lighting intensity, etc.) in real-time in response to sensor data indicating user gestures (e.g., a hand wave, a bump, etc.) and/or conditions external to headlamp 5 (e.g., changes in ambient light levels, etc.). In an embodiment, the control module includes logic pre-programmed to identify the occurrence of gestures or changes in conditions external to headlamp 5, based on analysis of data received from the sensor(s).

A voltage detection sensor may be used to monitor real-time voltage levels of the battery(ies). The control module is configured to compare real-time battery voltage information received from the voltage detection sensor to battery threshold values stored in memory to determine if a current mode of operation needs to be adjusted. In an embodiment, the control module is configured to automatically adjust power consumption of headlamp 5, based on remaining battery life measured by the control module. In an embodiment, the control module is configured to initiate a dim mode if a low battery condition is detected. If a low battery condition is detected, the control module is configured to activate a visual and/or audio indicator, e.g., a low battery light and/or audible beep, to indicate the low battery condition to the user.

A distance/proximity sensor may be used to detect nearby objects and determine distance to target. Based on the distance to target determined by the sensor, the control module is configured to increase or decrease light intensity. For example, if the light(s) is/are directed to a close-proximity manual being read by the user, the control module would reduce the light intensity and increase spread, based on proximity information from the sensor. Alternatively, if the light(s) is/are directed at a distant target, the control module would increase the light intensity and reduce spread, based on proximity information from the sensor, to concentrate the light on the distant target. The distance sensor may perform measurements to targets using any measurement detection means (e.g., lasers, sound waves, etc.) known in the art.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A headlamp, comprising:

a housing comprising a plurality of lighting compartments;

a first lighting compartment of the plurality of lighting compartments disposed at a front portion of the headlamp, the first lighting compartment comprising a plurality of forward-directed light sources comprising:

a spot-beam light source of the plurality of forward-directed light sources;

a flood-beam light source of the plurality of forward-directed light sources; and a night-vision light source comprising a red light source;

a second lighting compartment of the plurality of lighting compartments comprising a first peripheral light source that is configured to illuminate a first view area to a right of a center of the front portion of the headlamp;

a third lighting compartment of the plurality of lighting compartments comprising a second peripheral light source that is configured to illuminate a second view area to a left of the center of the front portion of the headlamp;

a battery compartment configured to accept at least one battery from a plurality of battery types, the plurality of battery types comprising dry-cell batteries and rechargeable batteries;

a plurality of push button switches configured to toggle between a plurality of lighting modes, where the plurality of lighting modes comprises at least a first lighting mode that activates the first peripheral light source and the second peripheral light source;

an adjustable headband; and a panel coupled to the housing via at least one hinge, the panel disposed at a rear of the headlamp opposite the front portion, the panel configured to pivot between a first position and a second position where the panel is configured to engage a fastener on the housing.

2. The headlamp of claim 1, further comprising:

a first reflector positioned adjacent the first peripheral light source, where the first reflector is configured to direct at least a portion of light emitted from the first peripheral light source to the first view area; and a second reflector positioned adjacent the second peripheral light source, where the second reflector is configured to direct at least a portion of light emitted from the second peripheral light source to the second view area.

3. The headlamp of claim 2, where:

the first peripheral light source is configured to illuminate the first view area to at least 110 degrees to the right of the center of the front portion of the headlamp, and the second peripheral light source is configured to illuminate the second view area to at least 110 degrees to the left of the center of the front portion of the headlamp.

4. The headlamp of claim 3, where:

at least a portion of the first view area is beside and behind the headlamp; and at least a portion of the second view area is beside and behind the headlamp.

5. The headlamp of claim 4, where:

the first reflector is positioned between the first peripheral light source and the spot-beam light source; and the second reflector is positioned between the second peripheral light source and the spot-beam light source.

6. The headlamp of claim 5, where:

the first peripheral light source comprises at least a first set of three vertically oriented light emitting diodes (LEDs); and the second peripheral light source comprises at least a second set of three vertically oriented LEDs.

7. The headlamp of claim 6, further comprising:

a first lens positioned adjacent to the first peripheral light source; and a second lens positioned adjacent to the second peripheral light source.

8. The headlamp of claim 7, where:

the first lens is configured to increase a first width of the first peripheral light source to a second width, where the second width is wider than the first width and the second lens is configured to increase a third width of the second peripheral light source to a fourth width, where the fourth width is wider than the third width.

9. The headlamp of claim 7, where:

the first lens comprises a first optical lens configured to increase a first degree of horizontal and vertical lighting; and the second lens comprises a second optical lens configured to increase a second degree of horizontal and vertical lighting.

10. The headlamp of claim 2, where:

at least a portion of the first view area extends to a right far peripheral portion of a user's vision; and at least a portion of the second view area extends to a left far peripheral portion of the user's vision.

11. The headlamp of claim 1, where the flood-beam light source emits a flood beam and the spot-beam light source emits a spot beam; wherein the flood beam is wider than the spot beam.

12. The headlamp of claim 1, further comprising a lighting control module configured to:

receive input from at least one of the plurality of push button switches; and selectively activate at least one of the spot-beam light source, the flood-beam light source, the night-vision light source the first peripheral light source, and the second peripheral light source according to at least one of the plurality of lighting modes based on the input.

13. A headlamp, comprising:

a housing comprising a plurality of lighting compartments;

a first lighting compartment of the plurality of lighting compartments disposed at a front portion of the headlamp, the first lighting compartment including a spot beam light source and a flood beam light source;

a second lighting compartment of the plurality of lighting compartments comprising a first peripheral light source that includes a first set of at least three vertically oriented light emitting diodes (LEDs), where a first reflector is positioned adjacent the first set of at least three vertically oriented LEDs of the first peripheral light source, where the first peripheral light source is configured to emit a first beam, where the first reflector is configured to reflect and direct at least a portion of the first beam to at least 110 degrees to a right of a center of the front portion of the headlamp;

a third lighting compartment of the plurality of lighting compartments comprising a second peripheral light source that includes a second set of at least three vertically oriented LEDs, where a second reflector is positioned adjacent the second set of at least three vertically oriented LEDs of the second peripheral light source, where the second peripheral light source is configured to emit a second beam, where the second reflector is configured to reflect and direct at least a portion of the second beam to at least 110 degrees to a left of the center of the front portion of the headlamp; and a plurality of push button switches configured to selectively activate the spot beam light source, the flood beam light source, the first peripheral light source and the second peripheral light source according to a plurality of lighting modes, where the plurality of lighting modes comprises at least a first lighting mode that activates the first peripheral light source and the second peripheral light source.

14. The headlamp of claim 13, where:

at least a portion of the first beam is directed by the first reflector behind the headlamp; and at least a portion of the second beam is directed by the second reflector behind the headlamp.

15. The headlamp of claim 14, where:

the first reflector is positioned between the first peripheral light source and the spot beam light source and is angled to direct the first beam behind the headlamp; and the second reflector is positioned between the second peripheral light source and the spot beam light source and is angled to direct the second beam behind the headlamp.

16. The headlamp of claim 15, where the first lighting compartment includes a red light source.

17. The headlamp of claim 16, further comprising:

an adjustable headband; and a panel coupled to the housing, the panel disposed at a rear portion of the headlamp opposite the front portion, where the panel is configured to removably couple the adjustable headband to the housing.

18. A headlamp, comprising:

a housing characterized by a front and a rear;

an adjustable headband;

a panel configured to removably secure the adjustable headband;

a hinge coupling the panel to the rear of the housing, the hinge configured to pivot the panel in a first position and a second position;

a first light source coupled to the housing, the first light source comprising a first light emitting diode to illuminate a first view area in a first fixed direction;

a second light source coupled to the housing, comprising a second light emitting diode to illuminate a second view area in a second fixed direction;

a plurality of forward-directed light sources coupled to the front of the housing, the plurality of forward-directed light sources comprising:

a third light source comprising a third light emitting diode, the third light source configured to create a first beam characterized by a first beam width;

a fourth light source comprising a fourth light emitting diode, the fourth light source configured to create a second beam characterized by a second beam width wider than the first beam width; and a red light emitting diode; and a plurality of push button switches configured to selectively activate the first light source, the second light source, and the plurality of forward-directed light sources according to a plurality of lighting modes, where the plurality of lighting modes comprises at least a first lighting mode that activates the first light source and the second light source to illuminate the first view area and the second view area.

19. The headlamp of claim 18, further comprising:

a first reflector positioned adjacent the first light source, where the first reflector is vertically oriented and configured to direct light emitted from the first light source to the first view area; and a second reflector positioned adjacent the second light source, where the second reflector is vertically oriented and configured to direct light emitted from the second light source to the second view area.

20. The headlamp of claim 19, where:

at least a portion of the first view area is beside and behind the headlamp; and at least a portion of the second view area is beside and behind the headlamp.

21. The headlamp of claim 20, where:

the first reflector is positioned entirely between the first light source and the third light source; and the second reflector is positioned entirely between the second light source and the third light source.

22. The headlamp of claim 21, where the plurality of lighting modes further comprises a night vision lighting mode that activates the red light emitting diode.

23. The headlamp of claim 22, where:

the first light emitting diode is configured illuminate the first view area in the first fixed direction of at least 110 degrees to a left of a center of the front of the headlamp, and the second light emitting diode to illuminate the second view area in the second fixed direction of at least 110 degrees to a right of the center of the front of the headlamp.

* * * * *